United States Patent [19]

Oishi

[11] 4,110,805

[45] Aug. 29, 1978

[54] MAGNETIC TAPE CASSETTE WITH OPPOSITELY INCLINED GUIDE MEMBERS FLANKING THE RECORDING/REPRODUCING STATION

[75] Inventor: Kengo Oishi, Odawara, Japan

[73] Assignee: Fuji Photo Film Co., Ltd., Minami-ashigara, Japan

[21] Appl. No.: 809,815

[22] Filed: Jun. 24, 1977

[30] Foreign Application Priority Data

Jul. 1, 1976 [JP] Japan ................................. 85812[U]

[51] Int. Cl.² ............................................. G11B 23/02
[52] U.S. Cl. ..................................... 360/132; 360/130
[58] Field of Search ........................... 360/130, 132, 93; 242/76, 199; 226/196

[56] References Cited

U.S. PATENT DOCUMENTS

| 2,916,228 | 12/1959 | Wellington | 242/76 |
| 3,042,331 | 7/1962 | Bierman | 242/76 X |
| 3,143,270 | 8/1964 | Cohen | 242/76 X |
| 3,889,900 | 6/1975 | Nelson | 242/76 X |
| 3,991,956 | 11/1976 | Machida | 242/76 X |
| 4,015,292 | 3/1977 | Kirn | 360/130 |
| 4,017,897 | 4/1977 | Blanding | 242/76 X |

*Primary Examiner*—John H. Wolff
*Attorney, Agent, or Firm*—Sughrue, Rothwell, Mion, Zinn & Macpeak

[57] ABSTRACT

A magnetic tape cassette having fixed guide members disposed on opposite sides of a pressing pad in a recording and reproducing station inclined in opposite directions of from 0.5° to 5.0°. Such inclination causes the travelling tape to ride down and tilt in at one guide member and to ride up and tilt out at the other guide member, whereby its intermediate orientation is always central and vertical to thereby correct and control any lateral tape displacement or misinclination due to cassette deformations, deck orientation, etc.

4 Claims, 5 Drawing Figures

MAGNETIC TAPE CASSETTE WITH OPPOSITELY INCLINED GUIDE MEMBERS FLANKING THE RECORDING/REPRODUCING STATION

BACKGROUND OF THE INVENTION

1 Field of the Invention

The present invention relates to a magnetic tape cassette having improved tape travel stability at the recording and reproducing station within the cassette.

2. Description of the Prior Art

With the recent trend toward small and light-weight tape cassette recorders, the development of small magnetic tape cassettes therefor and tapes which can be recorded and reproduced at high density for a long period of time has been stressed. To meet such a demand tapes such as the C-120, C-180 and the like have been put into practical use. In addition, the surface of the recording medium must have a mirror finish to accomodate higher density recordings.

A well-known miniaturized magnetic tape cassette of this type is shown in FIG. 1, and comprises a hollow plastic case 1 including an upper member 1a and a lower member 1b secured together by fixing means 1c. A tape travel route is defined by elements disposed within the case, including a pair of reels 2, 3, a fixed guide pin 4, a rotary guide roller 5, a fixed guide pin 6, a pressing pad 7, a fixed guide pin 8, a rotary guide roller 9, a fixed guide pin 10, and flat guide plates 11 inserted between the inner sides of the upper and lower members 1a, 1b and the reels 2, 3. A tape T wound onto the supply reel 2 is fed over the pressing pad 7, which urges the tape against a recording and reproducing head (not shown), to the take-up reel 3 while both edges of the tape are restrained from lateral movement by the guide plates 11.

When the recording and reproducing head is inserted through a receiving window 13, the magnetic tape passing through a recording and reproducing station 12 is pushed towards a shield plate 14 disposed behind the pressing pad 7 against the force of a biasing spring, whereby the tape is guided over the upright outer surfaces of the fixed pins 6 and 8 disposed upstream and downstream of the station 12.

Such a prior art cassette suffers from the following disadvantages, however:

(1) Since the plastic case members and internal elements are assembled by screws, ultrasonic adhesion, or the like, strains easily occur, and as a consequence the tape travel stability is impaired which results in unstable contact between the tape and the recording and reproducing head.

(2) Since the tape contact surfaces of the fixed guide pins 6, 8 are machined to have a vertical orientation, if the tape becomes laterally displaced in its travel path upstream or downstream of the pins, there is no way to correct such displacement resulting in a correspondingly displaced or inferior contact between the tape and the recording and reproducing head. Further, such displacement tends to increase as the thickness of the magnetic tape is decreased.

(3) The unstable or displaced contact described in paragraphs (1) and (2) above is often induced by changes in the mounting position of the cassette as between horizontal and vertical cassette decks, which produces differences in the electromagnetic conversion and output frequency characteristics.

SUMMARY OF THE INVENTION

The present invention overcomes the disadvantages noted above with respect to the prior art cassetts by providing a magnetic tape cassette which always guides and maintains the tape in a desired position relative to a recording and reproducing head. This is achieved by a cassette construction wherein the tape contacting and supporting surfaces of the fixed guide members immediately upstream and downstream of the recording and reproducing head are outwardly and inwardly inclined, respectively, within an angular range of from 0.5° to 5.0°.

DETAILED DESCRIPTION OF THE PREFERRED EMBODIMENTS

Figure 1:
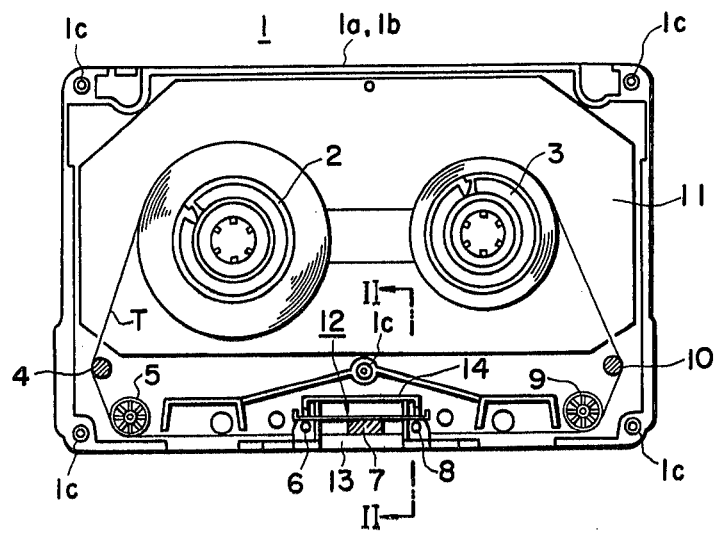
FIG. 1 shows a plan view of a conventional magnetic tape cassette.
Figure 2:
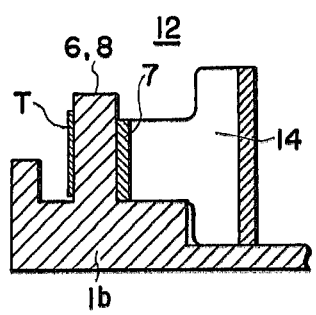
FIG. 2 shows a sectional view taken along line II—II of FIG. 1.
Figure 3:
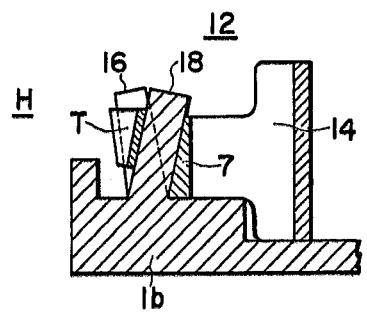
FIG. 3 shows a sectional view, similar to FIG. 2, of oppositely inclined fixed guide members in accordance with the present invention.
Figure 4:
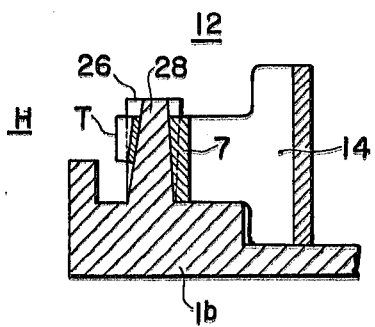
FIGS. 4 and 5 show sectional views, similar to FIG. 2 of modified forms of fixed, oppositely inclined guide members.
Figure 5:
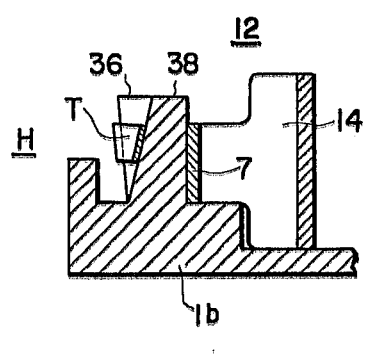

Referring now to FIGS. 3 - 5, with the exception of the two fixed guide pins 6, 8 disposed on opposite sides of the recording and reproducing station 12, the cassette of the present invention comprises the same structural elements shown in FIG. 1, and their description will thus not be repeated.

As fixed guide members in place of the pins 6, 8, the present invention employs a pin 16 made of polyacetal or the like whose entire outer peripheral suface in contact with the magnetic tape T is inclined slightly outwardly toward the magnetic head side H from the lower case 1b, and another pin 18 inclined slightly inwardly by an equal amount, as shown in FIG. 3. The pins 16, 18 are disposed on opposite sides of the pressing pad 7 to form and define the tape travel path, and appear parallel to each other when viewed from the front or window side of the cassette.

The angles of inclination of the pins 16 and 18 relative to the magnetic head are within a range of from 0.5° to 5.0° depending upon the thickness of the tape and the number of channels to be recorded therein, although these angles are exaggeratedly shown in the drawings.

When the upper and lower case members 1a, 1b are integrally assembled by means of screws or ultrasonic adhesion, the pins 16 and 18 are maintained in their initial directions of inclination even though their original angles may be somewhat increased or decreased. In addition, since the initial inclination angles are set within the relatively narrow range of from 0.5° to 5.0°, if strains should occur as a result of assembly no deformation is produced sufficient to impair the ease of travel of the magnetic tape, and any inclination change or deformation in the pins 16, 18 occurs equally and in opposite directions.

In operation, the magnetic tape is first guided over and past the outwardly inclined pin 16, whereat the tape moves upwardly (in FIG. 3) along the supporting or contact surface of the pin. Conversely, as the tape is guided over and past the oppositely or inwardly inclined pin 18, it moves or rides downwardly thereon. Intermediate the two pins at the pressing pad 7, the tape will therefore always be centrally and vertically disposed in the proper and optimum contact position and orientation relative to the recording and redproducing head. In other words, the tape gradually transfers from an upward and outwardly inclined position at pin 16 to a downward and inwardly inclined position at pin 18, whereby it will always assume a central and vertical position midway between the pins.

As will be readily apparent, the same transfer function and operation mode takes place if the tape is wound in a reverse direction, or if the relative inclinations of the pins 16, 18 are reversed.

Accordingly, even if the magnetic tape is initially laterally displaced or if its recording surface is forwardly or rearwardly inclined due to deformations in the fixed or rotary guide members 4, 5, 9 and 10, the feeding of the tape over the inclined pins 16, 18 positively controls and corrects any such displacement or misinclination at the recording and reproducing station, whereby the position of the tape relative to the recording, reproducing and erasing heads is always maintained constant in both vertical and horizontal cassette decks and in spite of cassette reversals from the A side to the B side.

The material of the pins 16, 18 is not limited to polyacetal, but ABS resin, styrole resin, stainless steel, or the like may also be used if they are suitably non-magnetic and hard surfaced.

Alternatively, as shown in FIG. 4, oppositely tapered pins 26, 28 having taper angles of from 0.5° to 5.0° may be extended upwardly from the lower case member 1b, or fixed, flat guide plates 36, 38 may be employed in which the opposite inclination angles are defined on the window sides thereof, as shown in FIG. 5.

In multi-channel magnetic tape cassettes for recording more than four channels, it is sometimes desirable to slightly tilt the tape in one direction at the recording and reproducing station. In such a case both of the pins or guide plates can be inclined in the same outward or inward direction, but the angle of inclination should not be excessively large, preferably about 2°.

What is claimed is:

1. In a magnetic tape cassette including a generally flat, hollow, rectangular case member (1), a windowed recording and reproducing station (12) defined at one edge of the case member and including a spring biased pressing pad (7) for urging a magnetic tape (T) against a recording and reproducing head insert through the window, and a plurality of fixed and rotary guide members (4, 5, 9, 10) disposed within the case member to guide a magnetic tape through the recording and reproducing station along a defined path of travel and including a pair of fixed guide members (6, 8) positioned in the same horizontal plane and disposed on opposite sides of the recording and reproducing station upstream and downstream thereof, respectively, relative to the forward direction of tape travel, the improvement characterized by:

the tape contacting surfaces of said pair of fixed guide members (16, 18, 26, 28, 36, 38) being oppositely inclined relative to the tape-contacting surface of an inserted magnetic recording and reproducing head at an angle of from 0.5° to 5.0°, whereby a travelling tape rides up on and is tilted toward the tape head by one of said pair of fixed guide members and rides down on and is tilted away from the tape head by the other of said pair of fixed guide members so that the tape assumes a stable position at which the upward and downward forces of the oppositely inclined fixed guide members are balanced, and wherein the intermediate transitional orientation of said tape between said pair of fixed guide members at the recording and reproducing station is therefore always central and vertical relative to said head, to thereby correct and control any lateral tape displacement or misinclination due to cassette deformations, deck orientation, and the like.

2. A magnetic tape cassette as defined in claim 1, wherein said pair of fixed guide members comprises a pair of non-magnetic, hard surfaced, cylindrical pins disposed parallel to each other as viewed from said one edge of the case member.

3. A magnetic tape cassette as defined in claim 1, wherein said pair of fixed guide members comprises a pair of non-magnetic, hard surfaced, oppositely tapered pins whose axes are disposed parallel to each other.

4. A magnetic tape cassette as defined in claim 1, wherein said pair of fixed guide members comprises a pair of non-magnetic, hard surfaced, flat plate members whose respective tape contacting surfaces are oppositely sloped.

* * * * *